March 1, 1932.  E. SOBEK  1,847,730

DISCHARGE FUNNEL FOR KILNS

Filed March 7, 1930

Witnesses.

Inventor.

Patented Mar. 1, 1932

1,847,730

UNITED STATES PATENT OFFICE

EMANUEL SOBEK, OF VIENNA, AUSTRIA

DISCHARGE FUNNEL FOR KILNS

Application filed March 7, 1930, Serial No. 434,120, and in Czechoslovakia April 28, 1929.

The present invention relates to a discharging funnel for kilns burning especially lime in large lumps and constitutes an extension of the device covered by American Patent No. 1,668,825.

It has been found that it is not necessary to extend the immovable guide plates forming an angle and disclosed in the patent referred to down to the outlet in order to divide the material coming out of the kiln into separate streams, i. e., that these guide plates may be shortened without reducing their efficiency with regard to lime in certain sizes. Moreover, the cross section of the shortened guide plates may be roof-shaped and the two sides of the roof may be of different length. The downwardly facing groove formed this way may serve for passing air into the kiln.

Figure 1:
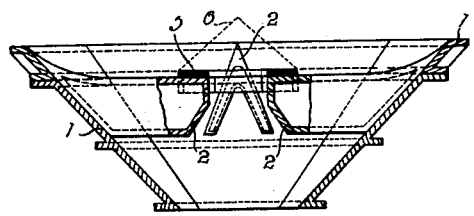
Figure 2:
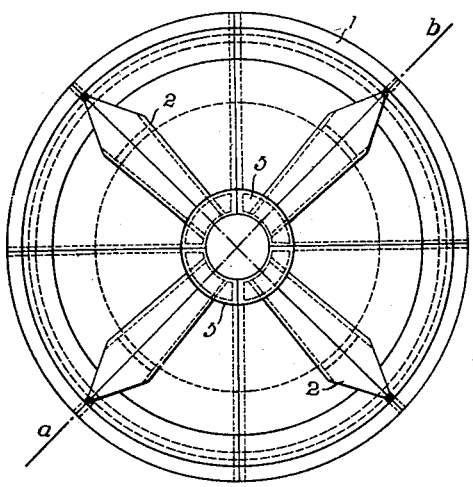
Figure 3:
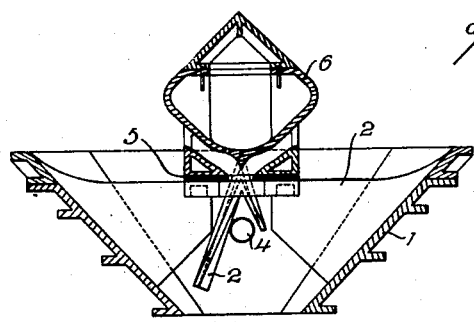
Figure 4:
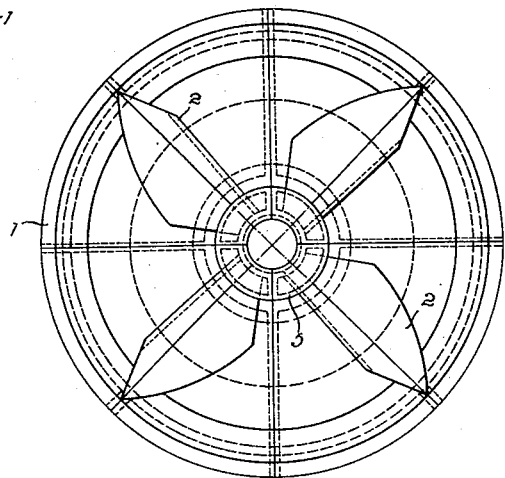

One embodiment of the invention is illustrated in the accompanying drawings, in which Figure 1 is a cross section of the discharge device; Fig. 2, a top view thereof; Fig. 3, a view of a modification wherein the sides of the roof are of different length; and Fig. 4, a top view of Fig. 3.

In the discharge funnel 1 the guide plates 2 are formed like bars and radiate from the center of the funnel towards its wall.

The cross section 3 of the guide plates is preferably of roof-like shape so that the material resting on these bars slides down on both sides. One side may be shorter than the other one, as shown in Fig. 3, according to the size of the lumps of which the material is composed.

The groove produced by these roof-shaped guide plates 2 and facing downwardly may serve for the direct supply of air to the kiln or contain an air supply pipe 4.

In the center of the discharge funnel where the guide plates 2 meet a plate 5 is preferably provided for carrying the nozzle 6 serving for supplying air to the kiln.

I claim:—

1. A discharge funnel for kilns, especially for burning lime in large lumps, comprising immovable guide plates firmly secured to its walls and radiating from its center, the said guide plates extending downwardly from the top of the funnel and terminating before reaching the discharge opening of the said funnel.

2. A discharge funnel according to claim 1 in which the guide plates are shortened to form bars.

3. A discharge funnel according to claim 1, in which the guide plates have a roof-shaped section and the sides of the roof are of different length.

4. The combination according to claim 1, in which the guide plates have a roof-shaped section and the sides of the roof are of different length, and a feed pipe positioned between the sides of the roof-shaped guide plates and adapted to supply air of combustion to the kiln.

In testimony whereof I have affixed my signature.

EMANUEL SOBEK.